March 16, 1954　　　　G. D. ARNOLD　　　　2,672,108
FURNACE

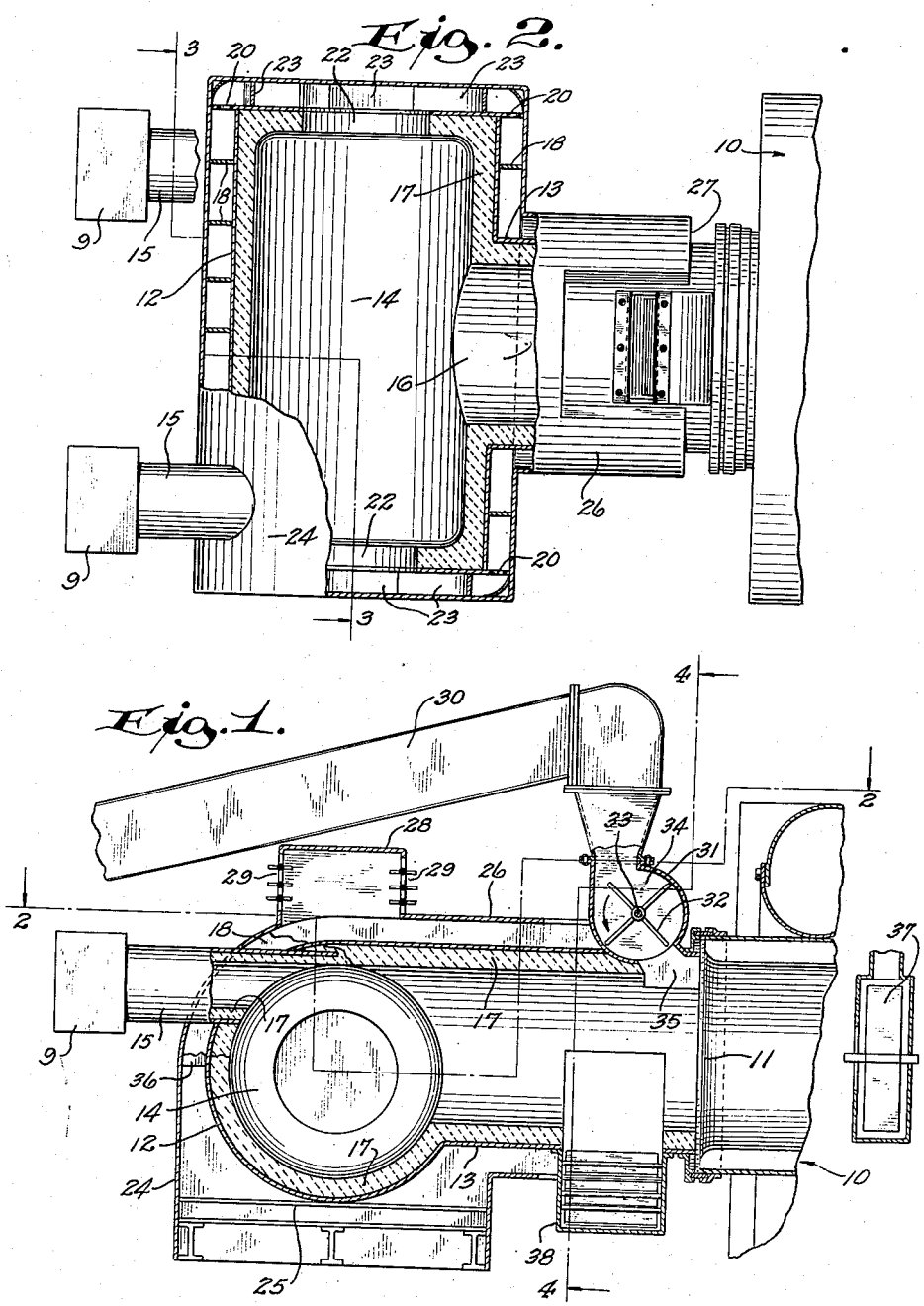

Filed Oct. 1, 1948　　　　　　　　　　　　3 Sheets-Sheet 2

INVENTOR.
Gerald D. Arnold
BY
Morsell & Morsell
ATTORNEYS.

March 16, 1954     G. D. ARNOLD     2,672,108

FURNACE

Filed Oct. 1, 1948     3 Sheets-Sheet 3

INVENTOR.
Gerald D. Arnold
BY
Mursell & Mursell
ATTORNEYS.

Patented Mar. 16, 1954

2,672,108

UNITED STATES PATENT OFFICE 2,672,108

FURNACE

Gerald D. Arnold, Milwaukee, Wis.

Application October 1, 1948, Serial No. 52,269

6 Claims. (Cl. 110—28)

This invention relates to improvements in furnaces.

The present invention is particularly adapted for use in connection with dehydrators for forage crops or other materials, and it is a general object to provide a furnace which is compact and of relatively large capacity for its size so as to render it suitable for use in connection with portable dehydrating equipment.

A further object of the invention is to provide a furnace having novel means for obtaining a uniform mixture between the secondary air and the products of combustion before the mixture enters the dehydrator drum.

A further object of the invention is to provide a furnace wherein there is a cylindrical mixing chamber and wherein the gases of combustion are admitted tangentially to said chamber to circulate in a circular direction around the mixing chamber and be tangentially discharged before entering the dehydrator drum.

A further object of the invention is to provide a furnace wherein secondary air is admitted in a novel manner to cool the outside shell of the furnace and to become preheated before it enters the mixing chamber.

A further object of the invention is to provide a construction as above described wherein the secondary air is directed in a circular path in the mixing chamber concentric with, in the same direction of rotation as, and within the newly admitted gases of combustion.

Other objects of the invention are to provide a furnace which produces efficient combustion of fuel, which is economical to build, and which delivers a maximum number of heat units per dollar of fuel cost.

With the above and other objects in view, the invention consists of the improved furnace, and all its parts and combinations, as set forth in the claims, and all equivalents thereof.

Cross reference is made to my co-pending application Serial No. 329,255, filed January 2, 1953, for an Agricultural Dehydrating System.

In the accompanying drawings, illustrating preferred embodiments of the invention, in which the same reference numerals designate the same parts in all of the views:

Fig. 1 is a side elevational view of a furnace showing it attached to a fragment of a dehydrator, parts being broken away and shown in vertical longitudinal section;

Fig. 2 is a view taken approximately on the line 2—2 of Fig. 1;

Figure 6:
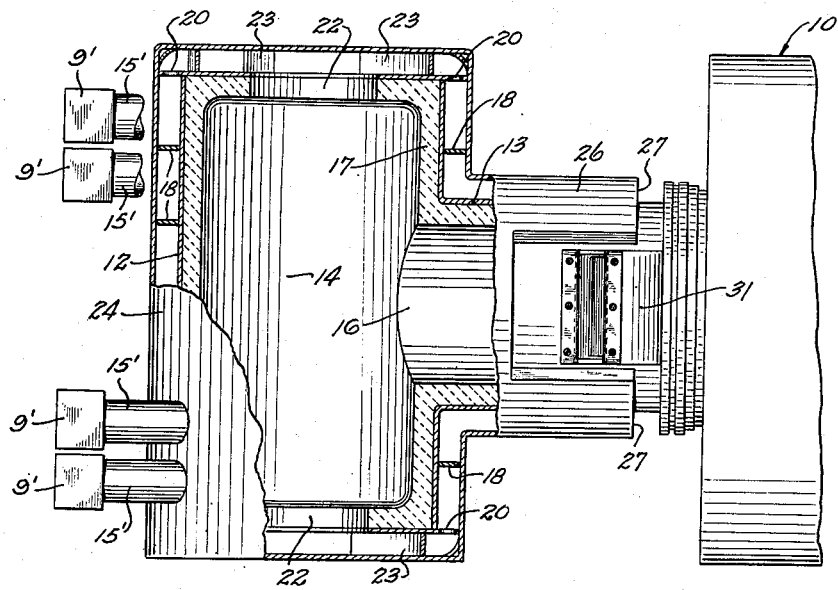
Fig. 6 is a view similar to Fig. 2 illustrating a modification.

Referring more particularly to the drawing, the numeral 10 designates a suitable dehydrator drum having an end opening 11. The improved furnace includes a cylindrical inner casing portion 12 having a suitably located discharge outlet which may take the form of a cylindrical throat 13. The latter preferably projects from the cylinder 12 intermediate its length and the axis of the cylinder 13 is preferably at right angles to the axis of the cylindrical portion 12, as illustrated. The chamber 14 within the cylindrical portion 12 constitutes a mixing chamber wherein combustion of gases delivered from intakes 15 of hot spot burners 9 is completed. The hot gases of combustion forcibly projected from the intakes 15 may be produced by any suitable means such as gas, fuel oil, or powdered coal. It is to be noted that the intakes 15 are located toward the ends of the cylindrical portion 12 and that there is no intake 15 directly opposite the throat opening 16. In the form of the invention illustrated in Fig. 2, there is one hot spot intake 15 on each side of the mixing chamber and in the form of the invention of Fig. 6, there are two hot spot intakes 15' and two burners 9', on each side of the mixing chamber. In each embodiment, the burner discharge enters the combustion chamber 14 tangentially at a point axially spaced from the outlet throat 13. The outlet 13 receives the flue gases delivered tangentially from the combustion chamber 14 after such gases have rotated about the chamber and have fully burned therein.

The mixing chamber 14, throat 13, and intake tubes 15 are lined with a suitable refractory material 17.

Figure 5:
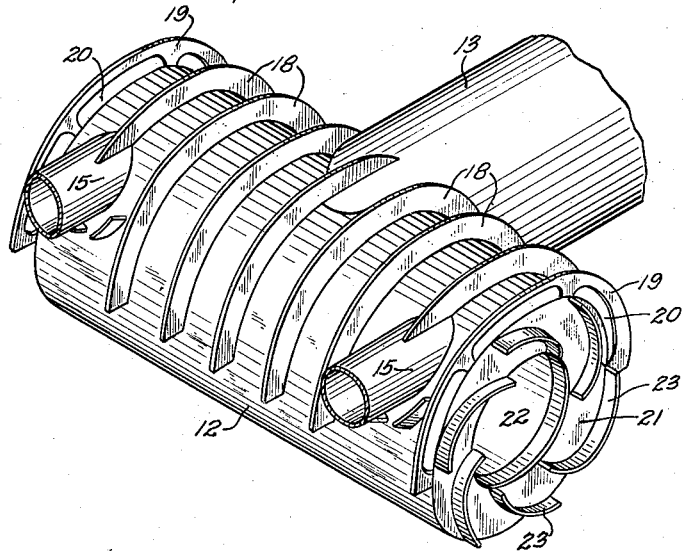
Fig. 5 is a perspective view of the furnace with the outer shell removed and with part of the throat broken away.

Projecting from the exterior of the mixing chamber cylinder 12, as is shown more clearly in Fig. 5, are a plurality of baffle members 18. These baffle members are preferably parallel to one another and preferably extend about 180° around the upper half of the mixing chamber cylinder 12. At each of the ends is a special baffle member 19 having slotted openings 20 therein. At the ends of the mixing chamber cylinder 12 are end members 21 having central openings 22. Surrounding the central openings are spirally extending curved baffle members 23, the ends of which are in overlapping relation, These baffles are arranged to cause the secondary air to move in the same circular direction as the gases of combustion both at the end openings 22 and within the mixing chamber 14.

Surrounding the mixing chamber cylinder 12 is an outer casing 24. The outer casing is closed at the bottom as at 25, and has its upper portion engaging the outer edges of the baffle members 18 as is clear from Figs. 1 and 2. The casing is provided with a forwardly extending tubular extension 26 which surrounds the throat 13 of the furnace. The tubular extension 26 is open as at 27 to admit secondary air into the annular space between the extension 26 and the throat 13. This air serves to cool the exterior of the throat 13 and at the same time becomes preheated.

Projecting upwardly from the top of the casing is an elongated dome 28 having louvred openings 29 through which additional secondary air may enter.

Figure 3:
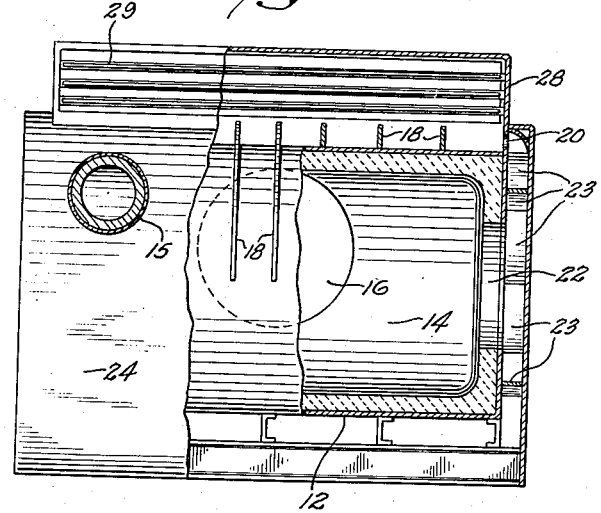
Fig. 3 is a partial sectional view taken approximately on the line 3—3 of Fig. 2.
Figure 4:
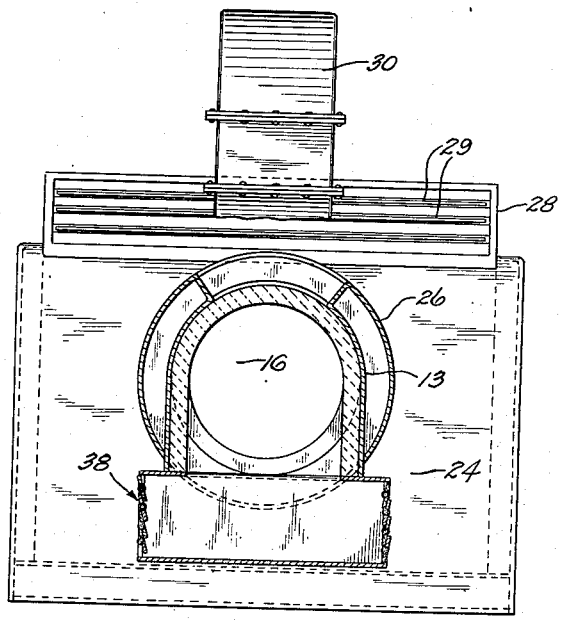
Fig. 4 is a sectional view taken on the line 4—4 of Fig. 1.

Material to be dried enters through a suitable conveyor 30 which may be of any well known type and falls downwardly into a feeding charger 31. The latter is formed with radially extending vanes 32 which are rotatable on a pivot 33. Material entering one of the compartments 34 between vanes is discharged into an opening 35 at the top of the throat 13 and adjacent the dehydrator opening 11. The feed conveyor 30 is of the same width as the rotary charger 31, as is clear from Fig. 4, to deliver material evenly across the entire width of the charger. The charger rotates in the direction indicated by the arrow to throw material at an angle forwardly and downwardly into the dehydrator drum. This eliminates the possibility of material falling straight down onto the bottom of the throat to stick, pile up, and become burned or scorched.

In use of the improved furnace, the hot gases of combustion from the hot spot intakes 15—15' move in a circular direction around the periphery of the mixing chamber 14 before entering the throat 13 and dehydrator 10. This is due to the tangential position of the hot spot intakes and to the fact that they are located out of line with the throat opening 16. It is to be understood that the movement of the gases through the dehydrator 10 is created by the usual suction fan 37 as is more fully described in my prior Patent No. 1,988,678, issued January 22, 1935.

This uninterrupted flow of the gases of combustion without employing any baffles within the combustion chamber or without causing any change in direction of movement around the periphery of the mixing chamber results in the elimination of back pressure and in more efficient use of the heat.

The secondary air to support combustion enters both at 27 and 29. Due to the baffles 18 this air will be directed in parallel annular paths over the upper portion of the mixing chamber cylinder 12, and before it enters the interior will have served to cool both the throat and the cylinder 12. In addition, it will become preheated. After passing beyond the baffle ends 36, the air will find its way to the ends of the mixing chamber cylinder and will enter the spaces between the spiral baffles 23. These baffles will direct the air in a circular or spiral course so that it will be whirling when it enters the end openings 22 of the mixing chamber. This whirling secondary air will be moving within and in the same direction as the circular path of movement of the gases of combustion. Both the secondary air and the gases of combustion travel in the same direction around the periphery of the mixing chamber 14 and both are discharged tangentially into the discharge throat 13 without changing direction. This type of discharge is made possible due to the fact that the upper portion of the discharge throat 13 extends tangentially of the casing 14 in the same direction that the circulating gases are induced thereinto by tangential force. The tangential force acting on the circulating gases is that force which acts on said moving gases in the direction of a tangent to the curved path of the gases. The movement of the secondary air into the furnace is induced by the suction created by the dehydrator fan 37. Eventually, however, because the secondary air is heavier than the products of combustion, the secondary air will become thoroughly mixed with the products of combustion and a heat transfer will take place. Due to the admission of secondary air at this point and in this particular manner, complete combustion is assured before the gases enter the dryer drum 10. The arrangement provides for a relatively long projection of the products of combustion and flame around the periphery of the mixing chamber and for immediate contact with the hot refractory material 17. Therefore, complete combustion is assured.

At the bottom of the throat 10 there may be a controlled by-pass air inlet 38. This may be used in case of emergencies such as interrupted flow of material or in case of a shut down of the dryer to admit additional air and prevent overheating of the dehydrator if there is a lack of material or if insufficient evaporation of moisture is taking place. The by-pass may also be used to prevent radiant heat within the mixing chamber 14 from being sucked into the dehydrator 10 after the burners have been shut off, and may also be used to furnish air for the purpose of advancing material through dehydrator until the latter is entirely emptied at the end of a run.

The furnace may have any number of hot spot burners 15 or 15' at the ends of the cylindrical portion 12. However, none should be directly opposite the discharge throat 16.

From the above it is apparent that a furnace which is particularly suited for use in connection with dehydrating apparatus has been provided. It is also clear that the furnace is compact and of relatively large capacity for its size due to the various features which increase the efficiency of combustion. The furnace may be used for other purposes than that specified and various changes and adaptations may be made without departing from the spirit of the invention, and all of such changes are contemplated as may come within the scope of the claims.

What I claim is:

1. A furnace comprising an elongated cylindrical casing having a cylindrical mixing chamber therein, said casing having a discharge opening intermediate its length, intake means on the periphery of the casing near each end thereof for admitting moving gases of combustion tangentially into said chamber to circulate in the same direction around the periphery thereof, means for admitting secondary air into an end of said chamber within the circular path of movement of the hot gases of combustion, and means for causing said air to move in the same direction as said gases of combustion.

2. A furnace comprising an elongated cylindrical casing having a cylindrical mixing chamber therein, said casing having a discharge opening intermediate its length, intake means on the periphery of the casing near each end thereof for admitting moving gases of combustion tangentially into said chamber to circulate in the same direction around the periphery thereof, means for admitting secondary air into both ends of said chamber within the circular path of movement of the hot gases of combustion, and means for causing said air to move in the same direction as said gases of combustion.

3. A furnace comprising a cylindrical inner casing having a cylindrical chamber therein, intake means on the periphery of said casing for directing hot gases of combustion tangentially into said chamber to circulate around the periphery thereof in one direction, an outer casing surrounding said first casing and spaced therefrom to provide an air circulating space, means for admitting secondary air into said space, means for dividing said air circulating space into a plurality of channels to distribute the air uniformly over the surface of the inner casing, and means for thereafter directing said air into at least one end of the inner casing and within the circular path of movement of said gases of combustion, and means for causing said air to move in the same direction as said gases of combustion, there being a discharge throat having a portion communicating tangentially with a portion of said inner casing which is axially removed from said hot gas intake means.

4. A furnace comprising a cylindrical casing having a cylindrical chamber therein, intake means on the periphery of said casing near each end thereof for directing hot gases of combustion tangentially into said chamber to circulate in the same direction around the periphery thereof, an outer casing surrounding said first casing and spaced therefrom to provide an air circulating space, means for admitting secondary air into said space, spaced baffles having portions which extend circularly around a portion of the periphery of the inner casing for dividing said air circulating space into a plurality of channels to distribute the air over a substantial portion of the surface of the inner casing, and means for thereafter directing said air into at least one end of the inner casing within the circular path of movement of the gases of combustion, and means for causing said air to move in the same direction as said gases of combustion, there being discharge means communicating with a portion of said inner casing which is axially removed from said hot gas intake means.

5. A furnace comprising a cylindrical inner casing having a cylindrical chamber therein, intake means on the periphery of said casing positioned to direct hot gases of combustion tangentially into said chamber to circulate around the periphery thereof in one direction, an outer casing surrounding said inner casing and spaced therefrom to provide an air circulating space, and a gas discharge throat having a portion projecting tangentially from a peripheral portion of said inner casing and communicating with the chamber thereof, said throat being removed in a direction axially of the inner casing from said hot gas intake means, said outer casing having an extension surrounding said throat, and said extension having its end open to the atmosphere to admit air to the air circulating space, means for directing air from the circulating space into said chamber within the circular path of movement of the gases of combustion, and means for causing said air to move in the same direction as said gases of combustion.

6. A furnace comprising a cylindrical inner casing having a cylindrical chamber therein, intake means on the periphery of said casing positioned to direct hot gases of combustion tangentially into said chamber to circulate around the periphery thereof in one direction, an outer casing surrounding said inner casing and spaced therefrom to provide an air circulating space, an air intake in said outer casing to admit air to the space, a gas discharge opening formed in a peripheral portion of said inner casing and communicating with the chamber thereof, a gas discharge throat having a portion extending tangentially from said opening in the direction of movement of gases discharged by tangential force through said opening, said throat being removed in a direction axially of the inner casing from said hot gas intake means, said outer casing having an extension surrounding said throat, means for directing air from the circulating space into an end of said chamber within the circular path of movement of the gases of combustion, and means for causing said air to move in the same direction as said gases of combustion.

GERALD D. ARNOLD.

References Cited in the file of this patent

UNITED STATES PATENTS

| Number | Name | Date |
|---|---|---|
| 901,232 | Eldred | Oct. 13, 1908 |
| 1,306,233 | Schutz | June 10, 1919 |
| 1,734,669 | Frisch | Nov. 5, 1929 |
| 1,795,347 | Reese | Mar. 10, 1931 |
| 1,852,968 | Hillhouse | Apr. 5, 1932 |
| 2,121,537 | Coghill | June 21, 1938 |
| 2,150,534 | Wiegand et al. | Mar. 14, 1939 |
| 2,196,864 | Hones | Apr. 9, 1940 |
| 2,357,301 | Bailey et al. | Sept. 5, 1944 |
| 2,395,103 | Clausen et al. | Feb. 19, 1946 |
| 2,448,595 | Holbrook | Sept. 7, 1948 |

FOREIGN PATENTS

| Number | Country | Date |
|---|---|---|
| 397,548 | Germany | June 26, 1924 |
| 637,112 | France | Jan. 24, 1928 |